United States Patent Office 3,817,936
Patented June 18, 1974

3,817,936
POLY(OXYALKYLENE)-POLYESTER-POLY-
SULFIDE CROSS-LINKED POLYMERS
AS SEALANTS
Faber B. Jones and Oren L. Marrs, Bartlesville, Okla.,
assignors to Phillips Petroleum Company
No Drawing. Continuation-in-part of abandoned application Ser. No. 53,313, July 8, 1970. This application
May 4, 1972, Ser. No. 250,291
Int. Cl. C08g 17/04, 23/22
U.S. Cl. 260—76                                      20 Claims

ABSTRACT OF THE DISCLOSURE

Mercaptoalkanoic acids and thiodialkanoic acids are reacted with a poly(oxyalkylene)-polyol having on average more than two pendent hydroxy groups per molecule to form a poly(oxyalkylene)-polyester-poly(monosulfide)-polythiol having on average more than two pendent thiol groups per molecule. The poly(oxyakylene)-polyester-poly(monosulfide)-polythiol is oxidatively coupled or cured, preferably in a sealant formulation, with an oxidative coupling or curing agent, including metallic oxides, peroxide, sulfur and the like, to form a composition useful as a sealant.

BACKGROUND OF THE INVENTION

This is a continuation-in-part application of our copending application having Ser. No. 53,313, filed July 8, 1970, and now abandoned, entitled "Poly(oxyalkylene)-Polyester-Polysulfide Cross-Linked Polymers as Sealants,"

This invention relates to cross-linked poly(oxyalkylene)-polyester-polysulfide polymers. In accordance with one aspect, poly(oxyalkylene)-polyester-poly(monosulfide)-polythiol polymers containing on average more than two pendent thiol groups per molecule are formed from mercaptoalkanoic and thiodialkanoic acids and poly(oxyalkylene)-polyols. In accordance with another aspects, poly(oxyalkylene)-polyester-poly(monosulfide) polythiol polymers are formed by the reaction of mercaptoalkanoic acids with thiodialkanoic acids and a poly(oxyalkylene)-polyol having at least three pendent hydroxy groups to form a poly(oxyalkylene)-polyester-poly(monosulfide)-polythiol. In accordance with a further aspect, poly(oxyalkylene)-polyester-poly(monosulfide)-polythiol polymers formed according to the invention are oxidatively coupled or cured in sealant formulations to form compositions useful as sealants. In accordance with a further aspect, mixtures of mercaptoalkanoic acids and thiodialkanoic acids formed by the hydrolysis of mixtures of mercaptonitriles and thiodinitriles are reacted with a poly(oxyalkylene)-polyol having on the average more than two pendent hydroxy groups to form poly(oxyalkylene)-polyester-poly(monosulfide)-polythiols having on the average more than two pendent thiol groups per molecule. In accordance with a further aspect, poly(oxyalkylene)-polyols having on average more than two pendent hydroxy groups are produced by the reaction of epoxy-substituted hydrocarbons with polyols prior to reacting with mixtures of mercaptoalkanoic acids and thiodialkanoic acids to form poly(oxyalkylene)-polyester - poly(monosulfide)polythiol polymers which are convertible to a cured state useful as sealants.

It is known that radicals and molecules having thiol functionality can be bonded to similar groups in other molecules, usually by oxidative coupling or curing. Because of this characteristic, polythiols have found application as sealants, coating, caulking compounds, and bonding compositions, etc. It is also known that numerous polythiols are expensive, inconvenient and, as a result, undesirable in such applications. For example, dithiols can be oxidatively crosslinked by reacting them with hydrocarbon polythiols having at least three mercapto groups per molecule. The hydrocarbon polythiol generally used in such applications due to its availability is propane-1,2,3-trithiol which suffers the disadvantage of having an obnoxious odor.

Accordingly, it is an object of this invention to provide sealants based on poly(oxyalkylene)-polyester-polysulfide cross-linked polymers.

It is another object of this invention to provide a process for the production of poly(oxyalkylene)-polyester-poly(monosulfide)-polythiols which are useful in sealant formulations.

Another object of this invention is to provide poly(oxyalkylene)-polyester - poly(monosulfide)-polythiols which are curable to sealants having improved properties.

Another object of this invention is to provide cured sealant compositions having improved elongation and tensile break properties.

Other aspects, objects and the several advantages of this invention will be apparent to those skilled in the art from a study of this disclosure and the appended claims.

SUMMARY OF THE INVENTION

In accordance with the invention, poly(oxyalkylene)-polyester-poly(monosulfide)-polythiols having on average more than two pendent thiol groups per molecule are formed by reacting at least one mercaptoalkanoic acid and at least one thiodialkanoic acid with poly(oxyalkylene)-polyols having on average more than two hydroxyl groups per molecule.

In accordance with the invention set forth in said copending application, poly(oxyalkylene)-polyester - poly(monosulfide)-polythiols having at least three pendent thiol groups per molecule are formed by reacting a mercaptoalkanoic acid and a thiodialkanoic acid with a poly(oxyalkylene)-polyol having at least three pendent hydroxy groups per molecule.

In accordance with another embodiment of the invention, the poly(oxyalkylene)-polyester-poly(monosulfide)-polythiols formed are oxidatively coupled or cured in a sealant formulation with an oxidative coupling or curing agent such as one or more of the metallic oxides, peroxides, sulfur, epoxides, and the like, to form an elastomeric sealant composition having improved elongation and tensile break properties.

In accordance with another embodiment, elastomeric sealant compositions having improved tensile break and elongation properties are provided comprising conventional sealant formulations, cross-linking agents, and poly(oxyalkylene)-polyester - poly(monosulfide)-polythiols of the invention.

Further in accordance with the invention, mixtures of at least one mercaptoalkanoic acid and at least one thiodialkanoic acid are reacted with poly(oxyalkylene)-polyols having on average more than two pendent hydroxy groups per molecule to form poly(oxyalkylene)-polyester-poly(monosulfide)-polythiols having on average more than two pendent thiol groups per molecule.

In accordance with a specific polymer produced, mixtures of mercaptoalkanoic and thiodialkanoic acids are reacted with poly(oxyalkylene)-polyols having at least on the average 2.5 percent hydroxy groups per molecule to form poly(oxyalkylene)-polyester-poly(monosulfide)-polythiols having at least on the average 2.5 pendent thiol groups per molecule.

In accordance with another embodiment of the invention set forth in said copending application, mixtures of mecraptoalkanoic acids and thiodialkanoic acids are reacted with a poly(oxyalkylene)-polyol having at least three pendent hydroxy groups per molecule to form a poly(oxyalkylene)-polyester - poly(monosulfide)-polythiol having at least three pendent thiol groups per molecule.

In accordance with a further embodiment of the invention, mixtures of mercaptoalkanoic acids and thiodialkanoic acids are formed by hydrolyzing mixtures of mercaptonitriles and thiodinitriles which can be produced by reaction of alkenenitriles and hydrogen sulfide.

In accordance with a presently preferred embodiment of the invention for the formation of mixtures of mercaptoalkanoic acids and thiodialkanoic acids, acrylonitrile is reacted with hydrogen sulfide to form a mixture of 3-mercaptopropionitrile and thiodipropionitrile which mixture is subsequently hydrolyzed, without the necessity of separation, to form a suitable mixture of 3-mercaptopropionic acid and thiodipropionic acid which mixture of acids is employed for reaction with poly(oxyalkylene)-polyols having on average more than two pendent hydroxy groups per molecule.

DESCRIPTION OF THE PREFERRED EMBODIMENTS

The mercaptoalkanoic acids which can be employed according to the process of the instant invention are represented as follows:

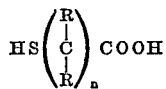

wherein R is H or alkyl having in the range of 1–5 carbon atoms, with a total of no more than 10 carbon atoms in all R groups per molecule; and wherein $n$ is an integer in the range of 1–5.

Illustrative examples of mercaptoalkanoic acids or mercaptohydrocarboncarboxylic acids that can be employed according to the invention include 2-mercaptoethanoic acid, 3-mercaptopropionic acid, 4-mercaptobutyric acid, 6-mercaptohexanoic acid, 6-mercaptoundecanoic acid, 6-mercapto-6-(2,2-dimethylpropyl)undecanoic acid, 6-mercapto-2-(2,2-dimethylpropyl)undecanoic acid, 2-mercapto-2-methylheptanoic acid, 3,3-dimethyl-6-mercaptohexanoic acid, 6 - mercapto - 2,2,3,3,4,4,5,5,6 - nonamethylheptanoic acid, and the like.

The thiodialkanoic acids which can be employed according to the process of the instant invention are represented as follows:

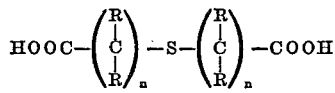

wherein R and $n$ are as defined above; with a total of no more than 20 carbon atoms in all R groups per molecule.

Representative examples of such thiodialkanoic acids that can be employed according to the invention include thiodipropionic acid [3-(2-carboxyethylthio)propanoic acid], carboxymethylthioethanoic acid, 4-(3-carboxypropylthio)butanoic acid, 6-(5-carboxypentylthio)hexanoic acid, 6-[1-(4-carboxybuty)hexylthio]undecanoic acid, 6-[1 - (4 - carboxybutyl) - 1 - (2,2 - dimethylpropyl)hexylthio]-6-[2,2dimethylpropyl]undecanoic acid, 6-(5-carboxy - 7,7 - dimethyloctylthio) - 2 - (2,2 - dimethylpropyl)hexanoic acid, 2-(1-carboxy - 1-methylhexylthio)-2-methylheptanoic acid, 6-(5-carboxy-4,4-dimethylpentylthio)-3,3-dimethylhexanoic acid, 6-(5-carboxy-1,1,2,2,3,3, 4,4,5 - nonamethylhexylthio) - 2,2,3,3,4,4,5,5,6 - nonamethylheptanoic acid, and the like.

As indicated above, one particularly preferred procedure for reacting the mercaptoalkanoic acids and thiodialkanoic acids with the poly(oxyalkylene)-polyol is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acid with thiodialkanoic acid. A presently preferred procedure for preparing such mixtures of mercaptoalkanoic and thiodialkanoic acids is by hydrolyzing a mixture of mercaptonitriles and thiodinitriles which can be produced from alkenenitriles and hydrogen sulfide according to the processes known to the art such as described in U.S. 3,280,163. For example, according to one presently preferred embodiment, acrylonitrile is reacted with hydrogen sulfide to form a mixture of 3-mercaptopropionitrile and thiodipropionitrile which mixture is subsequently hydrolyzed, without the necessity of separation, to form a suitable mixture of 3-mercaptopropionic acid and thiodipropionic acid.

Representative examples of nitriles that can be used as well as the other reaction parameters to form mixtures of mercaptoalkanoic acids and thiodialkanoic acids, are set forth in U.S. 3,280,163.

The poly(oxyalkylene)-polyols or polyhydroxy polyethers employed according to the invention have on average more than two and generally at least on the average 2.5, preferably at least three, pendent hydroxy groups per molecule. Such polyhydroxy polyethers or poly(oxyalkylene)-polyols have more than two, preferably three to about twelve, hydroxyl groups per molecule and molecular weights of from about 200 to about 20,000. These materials can be produced by the reaction of one or more epoxy-substituted hydrocarbons of the general formulas:

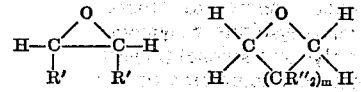

with a polyol of the general formula:

wherein either R' can be H or alkyl with the total number of carbon atoms in the molecule being in the range of up to and including about 20; wherein R'' can be alkyl or H with the total number of carbon atoms per molecule being in the range of up to and including about 20; and wherein $m$ can be an integer of from 1 to about 10, preferably 1 to 3; and wherein Y can be a hydrocarbon moiety with at least two and ordinarily from 3 to 40 carbon atoms per moiety and a valence equal to the value of $x$, $x$ is an integer of at least two and ordinarily from 3 to about 20, and the number of carbon atoms per molecule of $Y(OH)_x$ is equal to or greater than $x$.

Polyols that are employed in the preparation of the poly(oxyalkylene)-polyols or polyhydroxy polyethers of this invention comprise hydroxy-substituted hydrocarbons that are preferably saturated aliphatics, saturated cycloaliphatics, aryls, or combinations thereof that are substituted with more than two and preferably at least three hydroxyl groups per molecule. In the presently preferred embodiment of this invention, these polyols $Y(OH)_x$, can have from two up to about 12 hydroxyl groups per molecule, and can contain from 3 to about 20 carbon atoms per molecule. Illustrative of the polyols of this invention that can be represented by the general formula, $Y(OH)_x$, are ethylene glycol, 1,3-propanediol, 2-butene-1,4-diol, 1,4-cyclohexanediol, 2-ethylhexane-1,3-diol, glycerine, pentaerythritol, erythritol, 1,3,8-trihydroxycyclodedecane, estriol, 1,4,5,8-naphthalenetetrol, di(p-hydroxyphenyl)phenyl methanol, 1,2,6-hexanetriol, 1,2,4,6,7,9,12,14,15, 17,19,20-eicosanedodecol, and the like.

The poly(oxyalkylene)-polyols or polyhydroxy polyethers of this invention can be prepared by contacting at least one polyol of the formula $Y(OH)_x$, as defined above, with an epoxy-substituted hydrocarbon, as defined above, under suitable polymerization conditions, as is known to the art. For instance, glycerine can be contacted with an excess of propylene oxide (1,2-epoxypropane) under elevated pressure and in the presence of suitable polymerization promoters. Products of this type can also be obtained from commercial sources. Niax Polyol LHT-67 (a trademark) is a commercial product of this type. In the preparation of poly(oxyalkylene)-polyols having on average more than two pendent hydroxyl groups per molecule, mixtures of the above polyols such as at least one diol and another polyol can be reacted with the epoxy-substituted hydrocarbons defined above to form poly(oxyalkylene)-polyols having more than two pendent hydroxy groups on average per molecule. For instance, a mixture of 1,4-butanediol and 1,2,6-hexanetriol can be reacted with ethylene oxide to produce a poly(oxyethylene)-polyol having an average of more than two pendent hydroxy groups per molecule. Alternatively, a poly(oxyalkylene)-polyol produced, e. g. by the reaction of a diol such as ethylene glycol with an alkylene oxide such as propylene oxide, can be mixed with another poly(oxyalkylene)-polyol produced, e.g., by the reaction of a triol such as 1,2,6-hexanetriol with an alkylene oxide such as propylene oxide. As yet another alternative, up to about 30 weight percent of the poly oxyalkylene)-polyol can be replaced with a polyol having recurring ester linkages, e.g., an average of about 2 to about 5 ester linkages per molecule, in place of at least a portion of the ether linkages, produced, e.g., by reaction of a lactone such as caprolactone with a polyol such as ethylene glycol or with an alkylene oxide-polyol condensation product such as diethylene glycol.

Illustrative examples of the epoxy-substituted hydrocarbons of the above-defined formulas that can be employed with the polyols to form the poly(oxyalkylene)-polyol include 1,2-epoxypropane, 1,2-epoxyethane, 1,2-epoxydocosane, 10,11-epoxydocosane, 2,3-epoxy-4,5-dimethyldodecane, 1,3- epoxypropane, 1,12-epoxydodecane, 1,12-epoxy-2,11-dibutyldodecane, 1,4 - epoxy-2-(2,2-dimethyltetradecyl))butane, and the like.

The mixtures of mercaptoalkanoic acids and thiodialkanoic acids of this invention are reacted with the poly (oxyalkylene)-polyols of this invention to form the poly (oxyalkylene)-polyester-poly(monosulfide)-polythiols of this invention by an esterification reaction which can be effected in any suitable equipment at temperatures preferably in the range of 50 to about 250° C. The reaction can be conducted in the presence or absence of diluents that are substantially completely inert to the reactants and products under the reaction conditions employed. Such diluents can comprise as much as 95 weight percent of the reaction medium if employed. Acid esterification catalysts, such as para-toluenesulfonic acid, benzenesulfonic acid, $H_2SO_4$, and the like, can also be employed, if desired, to accelerate the rate of reaction. In that event, the diluents employed should also be inert to the said acid catalyst.

Examples of suitable diluents include toluene, benzene, xylene, cyclohexane, and the like.

The reaction pressure should be sufficient to prevent excessive loss of reactive materials at operating temperatures. Satisfactory pressures are normally within the range of about 0.5–10 atmospheres.

It is normally desirable to provide a means of removing water of reaction during the course of the esterification. This function can be accomplished by means known to the art such as a water trap.

The properties of the poly(oxyalkylene)-polyester-poly(monosulfide)-polythiols of the invention will vary somewhat depending upon the ratios of the various reactants and other reaction conditions. Normally these polymers will be viscous liquid short chain polymers, the chain length depending to considerable extent on the proportion of thiodialkanoic acids to mercaptoalkanoic acids. In general, a high proportion of thiodialkanoic acids to mercaptoalkanoic acids will yield longer polymer chains and a more viscous liquid or near solid product.

The esterification reaction should be effected to such an extent that at least about 80 percent of the pendent hydroxy groups of the poly(oxyalkylene)-polyol are reacted with carboxylic groups of the mercaptoalkanoic acid or thiodialkanoic acid to form ester groups. In general, in the range of about 0.8 to 1.2 equivalents of pendent hydroxy groups of the poly(oxyalkylene)-polyols are to be employed for each equivalent of carboxylic groups of the mercaptoalkanoic acid and thiodialkanoic acid. Nearly stoichiometric amounts or as much as a 10 equivalent percent excess of hydroxy groups are preferred to form the ester linkages which form the desired resultant poly (oxyalkylene)-polyester-poly(monosulfide)-polythiol. In general, more than two and preferably at least about three ester groups are formed for each molecule of poly (oxyalkylene)-polyol. Following the esterification reaction, it is desirable to neutralize the poly(oxyalkylene)-polyester-poly(monosulfide)-polythiol product prior to addition of the curing agent or agents. Suitable neutralization agents include ammonium hydroxide, lime and the like, and multiple-step neutralization can be used with intermediate separation of unreacted acid when desired.

The poly(oxyalkylene) - polyester-poly(monosulfide)-polythiols of this invention can be cured in a sealant formulation with conventional curing agents including free oxygen-containing fluids such as, for example, air; organic peroxides and hydroperoxides such as, for example, di-tert-butyl peroxide and cumene hydroperoxide; metal oxides such as, for example, the oxides of lead, zinc, manganese, calcium, barium, copper, mercury, tin and iron; metal salts of carboxylic acids such as, for example, lead stearate, zinc laurate, zinc acetate; ammonium persulfate; sulfur; and the like. The curing time will vary with the polymer, the curing agent, the sealant formulation, and the temperature. In general, sufficient curing agent is employed to convert at least about 70 percent of the pendent thiol groups to polysulfide groups.

Materials that can be employed together with the prepolymer of the invention and suitable curing agents in sealant formulations include any material conventionally used as a non-elastomeric component of sealant formulations, e.g., fillers, cure modifiers, pigments, plasticizers, extenders, stabilizers, modifiers, adhesion promoters, and the like such as calcium carbonate, titanium oxide, silica, tris-(dimethylamino)phenol, carbon black, dibutyl phthalate, chlorinated hydrocarbons, sulfur, alumina, polyethylene, polystyrene, zirconia, and the like. An adhesion promoter such as gamma-glycidoxypropyltrimethoxysilane can also be employed.

The amount of poly(oxyalkylene) - polyester - poly (monosulfide)-polythiol added to conventional sealant formulations containing non-elastomeric components will vary appreciably depending upon the desired final characteristics of the sealant composition. However, in general, the amount of poly(oxyalkylene)-polyester-poly (monosulfide)-polythiol present in the sealant formulation will range from 25 to 100 percent by weight. The remainder, if any, will comprise non-elastomeric components in varying proportions depending upon the characteristics of the poly(oxyalkylene) - polyester - poly (monosulfide)-polythiol and the final composition. As indicated above, the amount of curing agent added to the sealant formulation containing the poly(oxyalkylene)-polyester-poly(monosulfide)-polythiol will be sufficient to convert at least about 70 percent of the pendent thiol groups to polysulfide groups.

The non-elastomeric components of the sealant formulations, the poly(oxyalkylene)-polyester-poly(monosulfide)-polythiol of the invention and the curing agent can be blended together simultaneously and suitably agitated, for example, by machine blending, or the non-elastomeric materials can be premixed followed by addition of the poly(oxyalkylene) - polyester - poly(monosulfide) - polythiol and then addition of the curing agent. The particular technique for blending the ingredients will depend upon available equipment and the requirements of the sealant application problem.

Following mixing together of the non-elastomeric materials, the poly(oxyalkylene)-polyester-poly(monosulfide)-polythiols of the invention and the curing agents, the resultant sealant composition can be cured at ambient temperatures or at elevated temperatures if desired.

The sealants of this invention can be employed to join various substrates. For example, substrates such as wood, plastics, glass, stone such as granite, marble, or the like, concrete, or metals such as aluminum, steel, iron, zinc, or the like can be joined.

The value and operability of the process of this invention are demonstrated by the following examples:

EXAMPLE I

A stirred reactor was charged with 424.4 g. (8.0 moles) of acrylonitrile, 551 g. (16.2 moles) of hydrogen sulfide, 4 ml. of methylethylpyridine, and 8 g. of sulfur. The reactor was agitated for about 5 hours, the reaction beginning at room temperature and kept below 71° C. by external cooling. A product weighing 668.5 g. was recovered, and 13.4 g. (2%) of para-toluenesulfonic acid was added. The product was degassed on a steam bath and lost 16.0 g. The remaining product weighed 665.5 g. A 100 g. fraction of the product was distilled at 0.5 mm. Hg to yield 67.0 of mercaptopropionitrile product. This constituted a yield of 64 mole percent based on the acrylonitrile charged. The composition prepared by means of the reaction prior to distillation was determined to be comprised of 67.0 weight percent 3-mercaptopropionitrile, 29.2 weight percent dicyanoalkylsulfides and disulfides, and 2.0 weight percent of para-toluenesulfonic acid.

The product was hydrolyzed to a corresponding carboxylic acid as follows: 565.5 g. of the above reaction product and 843 ml. of concentrated HCl were charged to a reactor at room temperature, heated to and maintained at a temperature of about 100° C. for 5 hours. A total of 153.6 g. of product was recovered which was determined to contain 30.0 weight percent of 3-mercaptopropionic acid and 13.66 weight percent of thiodipropionic acid. The ratio of 3-mercaptopropionic acid to thiodipropionic acid was 69 weight percent to 31 weight percent.

Preparation of the poly(oxyalkylene)-polyester-poly(monosulfide)polythiol according to the process of this invention was effected as follows: A total of 480 g. of Niax LHT-34 [a trademark for a poly(oxyalkylene)-polyol derived from 1,2,6-hexanetriol and propylene oxide, having a molecular weight of about 4500 and a hydroxyl number of about 34] and a total of 90 g. of the mixed acid product prepared above (1 equivalent of carboxy groups per 1.1 equivalents of hydroxyl groups) were charged to a reactor with 6 g. of paratoluenesulfonic acid and 400 ml. of xylene. Heat was applied for a period of 5.5 hours and the water of reaction was azeotroped at reflux temperatures. The reaction product was treated with ammonium hydroxide solution to remove any unreacted acid and filtered. The filtrate was concentrated to give 464 g. of product which contained 1.24 weight percent thiol groups and had an acid number of 5.84 mg. of KOH per gram of sample. The acid number was reduced further by dissolving the polymer in xylene, treating with lime, filtering, and concentrating the mixture again to isolate the polymer product which contained 1.19 weight percent thiol groups and had an acid number of 1.01 mg. of KOH per gram of sample.

The poly(oxyalkylene)-polyester - poly(monosulfide)-polythiol prepared above was combined in a three-roll paint mill with further ingredients of a sealant formulation according to the following recipe:

| | Parts |
|---|---|
| Poly(oxyalkylene) - polyester - poly(monosulfide)-polythiol | 100 |
| CaCO$_3$ | 40 |
| TiO$_2$ | 20 |
| Silica, fumed | 5 |
| Tris-(dimethylamino)phenol | 1 |
| Aroclor 1254 [1] | 14.9 |
| Sulfur | 0.1 |

[1] A trade name for a polychlorinated diphenyl, a yellow tinted viscous oil having a distillation range of 365–390° C.

The mixture prepared according to the above recipe was then mixed with 7.5 parts of a 50–50 weight percent mixture of lead dioxide and dibutyl phthalate and 3 parts of gamma-glycidoxypropyltrimethoxysilane. After 7 days the resultant cured sealant composition which was cured at room temperature had the following properties:

TABLE I

| | | |
|---|---|---|
| 50 percent modulus [1] | p.s.i. | 62 |
| Tensile break [1] | p.s.i. | 444 |
| Elongation [1] | percent | 475 |

[1] ASTM 638–56T.

A control run was effected wherein 3-mercaptopropionic acid was employed to form a poly(oxyalkylene)-polyester-polythiol which had a viscosity of 1000 cps. [instead of a viscosity of 6100 cps., which the poly(oxyalkylene)-polyester-poly(monosulfide)-polythiol of the instant invention had], but which was otherwise prepared and formulated in the same manner as the above example. The resultant sealant had the following properties:

TABLE II

| | | |
|---|---|---|
| 50 percent modulus [1] | p.s.i. | 76 |
| Tensile break [1] | p.s.i. | 219 |
| Elongation [1] | percent | 150 |

[1] ASTM 638–56T.

This example demonstrates the preparation and oxidative coupling or curing of a poly(oxyalkylene)-polyester-poly(monosulfide)-polythiol of the instant invention to a poly(oxyalkylene) - polyester - polysulfide cross-linked polymer in a sealant formulation according to the process of the instant invention. The control run of this example demonstrates that analogous materials of the prior art wherein only mercaptoalkanoic acids are employed have considerably inferior properties when employed to form sealants as compared with the compositions of the instant invention; the control run exhibits poorer elongation and tensile break and is much less desirable for good sealant performance.

EXAMPLE II

A stirred reactor was charged with 26.5 g. (0.25 mole or 0.25 acid equivalent) 3-mercaptopropionic acid, 17.8 g. (0.10 mole or 0.20 acid equivalent) 3,3'-thiodipropionic acid, 240.7 g. (0.05 mole or 0.15 hydroxy equivalent) Niax LHT-34 [a poly(oxyalkylene)-polyol derived from 1,2,6-hexanetriol and propylene oxide, having a molecular weight of about 4500 and a hydroxyl number of about 34], 79.8 g. (0.15 mole or 0.30 hydroxy equivalent) Niax D-510 [a mixture of diols having recurring ester groups, about 95 weight percent being represented by the formula

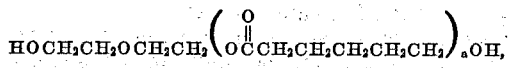

where $a$ has an average value of 3–4, and about 5 weight percent being represented by the formula

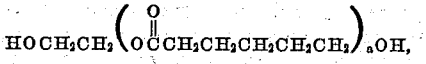

where $a$ is as defined above, the mixture of diols having a molecular weight of about 532 and a hydroxyl number of about 210], 3.2 g. p-toluenesulfonic acid, and 600 ml.

of xylene. The mixture of poly(oxyalkylene)-polyol and diols had an average of about 2.5 pendent hydroxy groups per molecule. Heat was applied, and the water was azeotroped at reflux temperature. The total reaction time was 16 hours. The reaction mixture was cooled to 30° C. and treated with 20 g. lime. After stirring for 2 hours, the resulting slurry was filtered through a pad of filter aid, and solvent was removed from the filtrate. The residual poly(oxyalkylene) - polyester-poly(monosulfide)-polythiol product contained 1.95 weight percent thiol groups and had an acid number of 0.04 mg. of KOH per gram of sample. The viscosity was 3000 centipoises at 25° C.

The polymer product above was mixed with other ingredients of a sealant formulation according to the following recipe:

| | Grams |
|---|---|
| Poly(oxyalkylene) - polyester-poly(monosulfide)-polythiol | 25 |
| CaCO₃ | 10 |
| TiO₂ | 5 |
| Silica, fumed | 1.5 |
| Tris(dimethylamino)phenol | 0.25 |
| Chlorafin 50 [1] | 3.97 |
| Sulfur | 0.03 |

[1] A trade name for a chlorinated paraffin, a light yellow, viscous oil.

The above mixture was then mixed with 3.75 g. of a 50–50 weight percent mixture of lead dioxide and dibutyl phthalate and 0.75 g. of gamma-glycidoxypropyltrimethoxysilane. After 12 days the resultant cured sealant composition, which was cured at room temperature (about 25° C.), had the following properties, determined as in Example I.

| 50 percent modulus | p.s.i. | 44.8 |
|---|---|---|
| Tensile break | p.s.i. | 175 |
| Elongation | percent | 702.5 |

Thus, the properties of the cured composition as shown above demonstrate the utility, in a sealant formulation, of a poly(oxyalkylene)-polyester - poly(monosulfide)-polythiol as prepared through the use of a mixture of poly(oxyalkylene)-polyol and diols having an average of about 2.5 hydroxy groups per molecule. The cured composition had a particularly good balance of properties, indicated in part by its low modulus and high elongation.

We claim:

1. A poly(oxyalkylene) - polyester-poly(monosulfide)-polythiol having at least three pendent thiol groups per molecule consisting essentially of the reaction product of
   (a) a mercaptoalkanoic acid having the formula

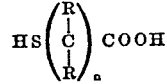

wherein R is selected from the group consisting of hydrogen and alkyl radicals having from 1–5, inclusive, carbon atoms, the maximum number of carbon atoms in all R groups being 10, and n is an integer ranging from 1–5,
   (b) a thiodialkanoic acid having the formula

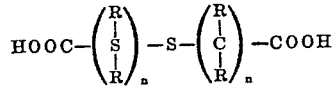

wherein R and n are as defined above, the maximum number of carbon atoms in all R groups being 20, and
   (c) a poly(oxyalkylene)-polyol having at least three pendent hydroxy groups per molecule and a molecular weight in the range 200–20,000, the amount of (c) present being in the range 0.8–1.2 equivalent of pendent hydroxy groups for each equivalent of carboxylic groups of the mercaptoalkanoic and thiodialkanoic acids.

2. A polythiol according to claim 1 wherein (c) is the reaction product of
   (d) at least one epoxy hydrocarbon selected from the group consisting of

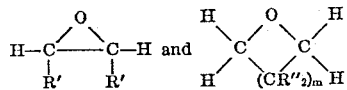

wherein R' and R'' are selected from the group consisting of hydrogen and alkyl radicals with the total number of carbon atoms per molecule ranging up to and including 20 carbon atoms, and m ranges from 1–10 with
   (e) a polyol of the formula $$Y(OH)_x$$

wherein Y is a hydrocarbon radical having from 3 to 40, inclusive, carbon atoms per radical and a valence equal to the value of x, and x is an integer in the range 3 to 20.

3. A composition useful as a sealant comprising the polythiol of claim 1 and a curing agent selected from metallic oxides, organic peroxides, organic hydroperoxides, metallic salts of carboxylic acids, ammonium persulfate, and sulfur in an amount sufficient to convert at least about 70 percent of the pendent thiol groups to polysulfide groups, and the amount of (a) employed ranges from 5 to 95 weight percent based upon the total of (a) and (b).

4. A polythiol according to claim 1 wherein
   (a) is 3-mercaptopropionic acid,
   (b) is thiodipropionic acid, and
   (c) is a poly(oxyalkylene)-polyol formed by reacting 1,2,6-hexanetriol and propylene oxide, and further wherein the amount of (a) employed ranges from 60 to 80 weight percent based upon the total of (a) and (b).

5. A composition useful as a sealant comprising the polythiol of claim 4 which contains lead dioxide as the curing agent.

6. A composition useful as a sealant according to claim 3 further comprising a filler.

7. A composition useful as a sealant comprising the polythiol of claim 4 which contains sulfur as the curing agent.

8. A composition useful as a sealant according to claim 6 further comprising a plasticizer and an antioxidant.

9. A poly(oxyalkylene)-polyester - poly(monosulfide)-polythiol having on average more than two pendent thiol groups per molecule consisting essentially of the reaction product of
   (a) at least one mercaptoalkanoic acid having the formula

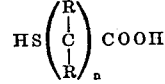

wherein R is selected from the group consisting of hydrogen and alkyl radicals having from 1–5, inclusive, carbon atoms, the maximum number of carbon atoms in all R groups being 10, and n is an integer ranging from 1–5,
   (b) at least one thiodialkanoic acid having the formula

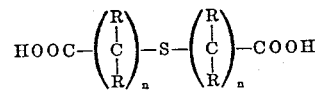

wherein R and n are as defined above, the maximum number of carbon atoms in all R groups being 20, and
   (c) at least one poly(oxyalkylene)-polyol containing on average more than two pendent hydroxy groups per molecule and a molecular weight in the range 200–20,000, the amount of (c) present being in the range 0.8–1.2 equivalents of pendent hydroxy groups for each equivalent of carboxylic groups of the mercaptoalkanoic acid and thiodialkanoic acid.

10. A polythiol according to claim 9 in which the poly(oxyalkylene)-polyol has on average at least about 2.5 pendent hydroxy groups per molecule.

11. A polythiol according to claim 9 wherein (a) is 3-mercaptopropionic acid, (b) is thiodipropionic acid, and (c) is a mixture of (1) a poly(oxyalkylene)-polyol formed by reacting 1,2,6-hexanetriol and propylene oxide and (2) a mixture of diols having recurring ester groups, about 95 weight percent being represented by the formula

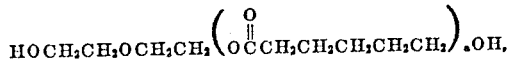

where $a$ has an average value of 3–4, and about 5 weight percent being represented by the formula

where $a$ is as defined above.

12. A composition useful as a sealant comprising the polythiol of claim 9 and a curing agent selected from metallic oxides, organic peroxides, organic hydroperoxides, metallic salts of carboxylic acids, ammonium persulfate, and sulfur in an amount sufficient to convert at least about 70 percent of the pendent thiol groups to polysulfide groups, and the amount of (a) employed ranges from 5 to 95 weight percent based upon the total of (a) and (b).

13. A composition useful as a sealant according to claim 12 further comprising a filler, plasticizer and antioxidant.

14. A process for the production of a sealant which process comprises reacting (a) a mercaptoalkanoic acid having the formula

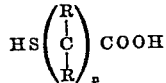

wherein R is selected from the group consisting of hydrogen and alkyl radicals having from 1–5, inclusive, carbon atoms, the maximum number of carbon atoms in all R groups being 10, and $n$ is an integer ranging from 1–5, with (b) a thiodialkanoic acid having the formula

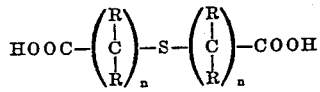

wherein R and $n$ are as defined above, the maximum number of carbon atoms in all R groups being 20, and (c) a poly(oxyalkylene)-polyol having on average more than two pendent hydroxy groups per molecule to form a poly(oxyalkylene) - polyester - poly(monosulfide)-polythiol, the amount of (c) present being in the range 0.8–1.2 equivalents of pendent hydroxy groups for each equivalent of carboxylic groups of the mercaptoalkanoic acid and thiodialkanoic acid, and (d) adding to said polythiol obtained in step (c) a curing agent selected from metallic oxides, organic peroxides, organic hydroperoxides, metallic salts of carboxylic acids, ammonium persulfate, and sulfur in an amount sufficient to convert at least about 70 percent of the pendent thiol groups to polysulfide groups, and allowing same to cure to form a sealant having improved elongation and tensile break properties.

15. A process according to claim 14 wherein the temperature during said reacting ranges from 50–250° C., said reacting is carried out in the presence of an acid esterification catalyst and a diluent, and wherein water is removed during the course of reaction.

16. A process according to claim 14 wherein at least about 80 percent of the pendent hydroxy groups of the poly(oxyalkylene)-polyol are reacted with carboxylic groups of the mercaptoalkanoic acid or thiodialkanoic acid to form ester groups, and the amount of (a) employed ranges from 5 to 95 weight percent based upon the total of (a) and (b).

17. A process according to claim 14 wherein the mercaptoalkanoic acid is 3-mercaptopropionic acid, the thiodialkanoic acid is thiodipropionic acid, and the poly(oxyalkylene)-polyol is formed by reacting 1,2,6-hexanetriol and propylene oxide.

18. A process according to claim 17 wherein the amount of (a) employed ranges from 60 to 80 weight percent based upon the total of (a) and (b), and further wherein the curing agents are sulfur and lead dioxide, and wherein a filler, plasticizer and an antioxidant are incorporated into the sealant.

19. A process according to claim 14 wherein the curing agents are sulfur and lead dioxide, and further wherein a filler, plasticizer and an antioxidant are incorporated therein.

20. A process according to claim 14 wherein (a) is 3-mercaptopropionic acid, (b) is thiodipropionic acid, and (c) is a mixture of (1) a poly(oxyalkylene)-polyol formed by reacting 1,2,6-hexanetriol and propylene oxide and (2) a mixture of diols having recurring ester groups, about 95 weight percent being represented by the formula

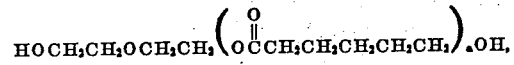

where $a$ has an average value of 3–4, and about 5 weight percent being represented by the formula

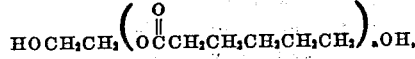

where $a$ is as defined above.

No references cited.

MELVIN M. GOLDSTEIN, Examiner

U.S. Cl. XR

260—31.8 XA, 40 R, 873